US008897712B2

(12) United States Patent
Sofer et al.

(10) Patent No.: US 8,897,712 B2
(45) Date of Patent: Nov. 25, 2014

(54) DEVICE, SYSTEM AND METHOD OF WIRELESS COMMUNICATION VIA MULTIPLE ANTENNA ASSEMBLIES

(71) Applicant: Intel Corporation, Santa Clara, CA (US)

(72) Inventors: Menashe Sofer, Herzelya (IL); Assaf Kasher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/027,216

(22) Filed: Sep. 15, 2013

(65) Prior Publication Data

US 2014/0018005 A1 Jan. 16, 2014

Related U.S. Application Data

(63) Continuation of application No. 12/639,044, filed on Dec. 16, 2009, now Pat. No. 8,548,385.

(51) Int. Cl.
*H04B 1/00* (2006.01)
*H04B 15/00* (2006.01)
*H04B 7/08* (2006.01)
*H04B 7/04* (2006.01)
*H04B 7/06* (2006.01)

(52) U.S. Cl.
CPC ............... *H04B 7/04* (2013.01); *H04B 7/0805* (2013.01); *H04B 7/0608* (2013.01)
USPC ............. 455/63.4; 455/63.1; 455/68; 455/69; 455/25; 455/561; 342/350; 342/354; 342/359; 342/360; 342/367; 342/368

(58) Field of Classification Search
USPC ........ 455/25, 63.1–63.4, 67.11, 67.13, 67.14, 455/68, 69, 561, 562.1, 575.1, 575.7, 101; 342/350, 354, 359, 360, 367, 368
See application file for complete search history.

(56) References Cited

U.S. PATENT DOCUMENTS 5,905,473 A * 5/1999 Taenzer .................. 343/834
6,246,364 B1 * 6/2001 Rao et al. ................ 342/368

(Continued)

FOREIGN PATENT DOCUMENTS

CN 101542937 9/2009
JP 09200115 7/1997

(Continued)

OTHER PUBLICATIONS

Office Action for Chinese Patent Application No. 201010597556.5, mailed on Jan. 13, 2014, 6 pages, including 3 pages of English translation.

(Continued)

*Primary Examiner* — Tuan A Tran
(74) *Attorney, Agent, or Firm* — Shichrur & Co.

(57) ABSTRACT

Some demonstrative embodiments include devices, systems and/or methods of wireless communication via multiple antenna assemblies. For example, a device may include a wireless communication unit to transmit and receive signals via one or more quasi-omnidirectional antenna assemblies, wherein the wireless communication unit is to transmit, via each quasi-omnidirectional antenna assembly, a plurality of first transmissions, to receive, in response to the first transmissions, a plurality of second transmissions from another device via one or more of the quasi-omnidirectional antenna assemblies, and, based on the second transmissions, to select at least one selected transmit antenna assembly for transmitting to the other device and a selected receive antenna assembly for receiving transmissions from the other device. Other embodiments are described and claimed.

30 Claims, 5 Drawing Sheets

(56) References Cited

U.S. PATENT DOCUMENTS

| | | | |
|---|---|---|---|
| 7,047,046 B2* | 5/2006 | Hoffmann et al. | 455/562.1 |
| 7,103,386 B2* | 9/2006 | Hoffmann et al. | 455/562.1 |
| 7,539,458 B2* | 5/2009 | Jafarkhani et al. | 455/63.1 |
| 7,769,098 B2* | 8/2010 | Borkar et al. | 375/267 |
| 7,920,533 B2* | 4/2011 | Koo et al. | 370/338 |
| 8,019,287 B2* | 9/2011 | Harrison et al. | 455/69 |
| 8,054,223 B2* | 11/2011 | Lakkis | 342/367 |
| 8,095,074 B2* | 1/2012 | Wu et al. | 455/63.4 |
| 8,165,241 B2* | 4/2012 | Lin et al. | 375/267 |
| 8,548,385 B2 | 10/2013 | Sofer et al. | |
| 8,699,405 B2* | 4/2014 | Yamaura | 370/322 |
| 2004/0002324 A1* | 1/2004 | Juntunen et al. | 455/406 |
| 2006/0014511 A1* | 1/2006 | Ghassemzadeh et al. | 455/277.1 |
| 2006/0063492 A1 | 3/2006 | Iacono et al. | |
| 2009/0121936 A1 | 5/2009 | Maltsev et al. | |
| 2009/0232023 A1 | 9/2009 | Soffer et al. | |
| 2009/0233545 A1 | 9/2009 | Sutskover et al. | |
| 2009/0238156 A1 | 9/2009 | Yong et al. | |
| 2009/0279448 A1 | 11/2009 | Lakkis | |

FOREIGN PATENT DOCUMENTS

| | | |
|---|---|---|
| JP | 2000059279 | 2/2000 |
| JP | 2008512955 | 4/2008 |
| JP | 2008219554 | 9/2008 |
| WO | 2009061964 | 5/2009 |

OTHER PUBLICATIONS

IEEE Std 802.11™—2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications.

Office Action for Chinese Patent Application No. 201010597556.5, mailed on Mar. 25, 2013, 9 pages, including 4 pages of English translation.

Office Action for Japanese Patent Application No. 2012544522, mailed on Jul. 30, 2013, 5 pages, including 2 page of English translation.

International Preliminary Report on Patentability for PCT Application No. PCT/US2010/056220, mailed on Jun. 28, 2012, 5 pages.

International Search Report and Written Opinion for PCT Application No. PCT/US2010/056220, mailed on Jul. 27, 2011, 10 pages.

Office Action for U.S. Appl. No. 12/639,044, mailed on Jan. 18, 2013, 13 pages.

Office Action for Japanese Patent Application No. 2012-544522, mailed on May 27, 2014, 4 pages, including 2 pages Of English translation.

Office Action for Chinese Patent Application No. 201010597556.5, mailed on Jul. 30, 2014, 6 pages, including 3 pages of English translation.

* cited by examiner

DEVICE, SYSTEM AND METHOD OF WIRELESS COMMUNICATION VIA MULTIPLE ANTENNA ASSEMBLIES

CROSS-REFERENCE

This application is a Continuation Application of U.S. patent application Ser. No. 12/639,044, filed Dec. 16, 2009 and entitled "Device, System and Method of Wireless Communication Via Multiple Antenna Assemblies", the entire disclosure of which is incorporated herein by reference.

BACKGROUND

Beamforming may be used by antenna arrays for directional and/or spatial signal transmission and/or reception.

A beamforming training session may be implemented by two wireless communication devices in order, for example, to select effective receive and/or transmit beamforming patterns to be used for wireless communication between the devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
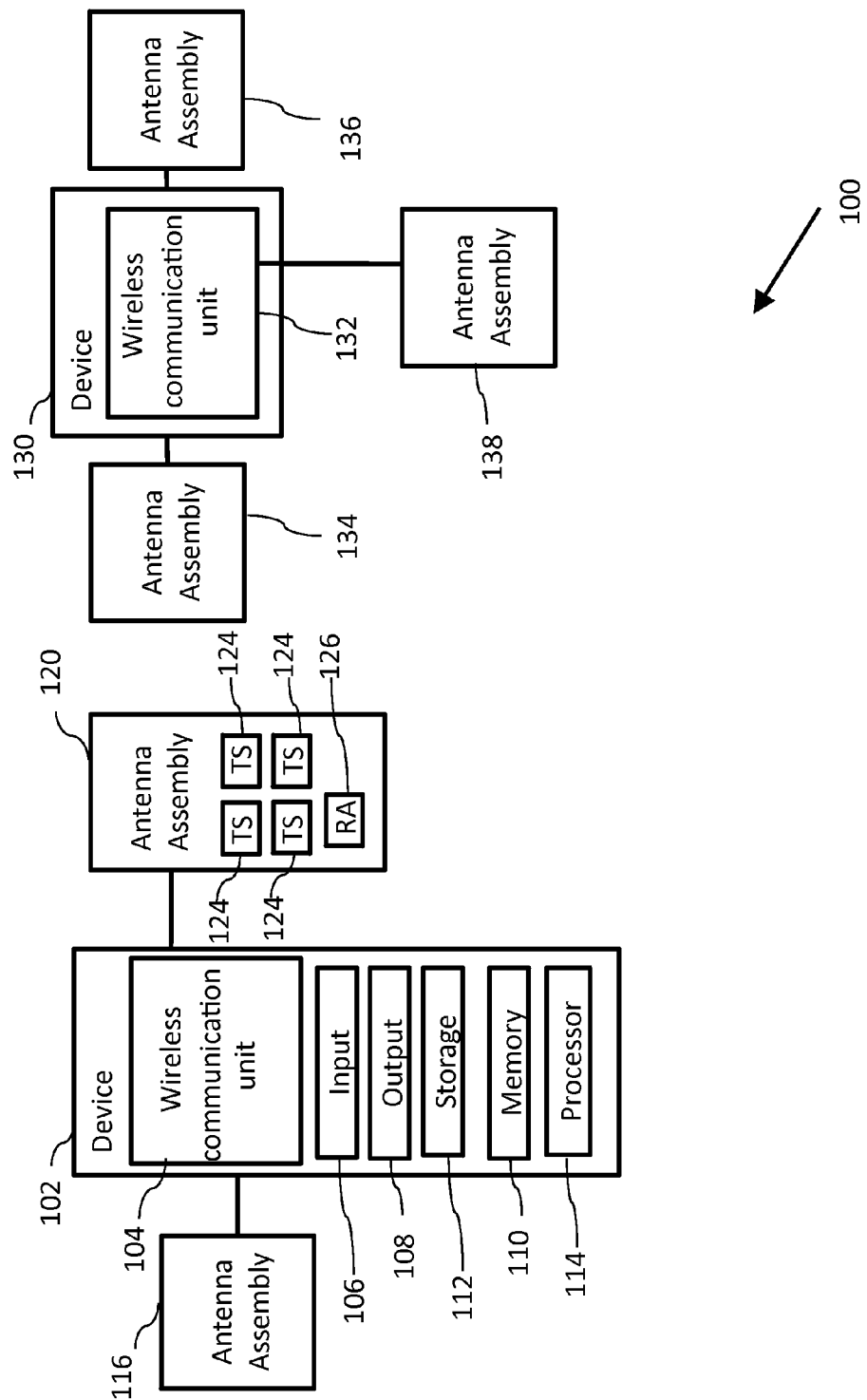
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (IEEE 802.11-1999: Wireless LAN Medium Access Control (MAC) and Physical Layer (PHY) Specifications), 802.11a, 802.11b, 802.11g, 802.11h, 802.11j, 802.11n, 802.11 task group ad (TGad), 802.15.3c, 802.16, 802.16d, 802.16e, 802.16f, standards and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the IEEE 802.11, IEEE 802.11TGad and/or WGA specifications, and the like.

The phrase "antenna assembly", as used herein, may include any suitable configuration, structure and/or arrangement of one or more antenna elements, components, units and/or arrays. For example, an antenna assembly may include at least one of a phased array antenna, a single element antenna, a set of switched beam antennas, and the like. In some embodiments, the antenna assembly may implement transmit and receive functionalities using separate transmit and receive antenna elements. In some embodiments, the antenna assembly may implement transmit and receive functionalities using common and/or integrated transmit/receive elements.

The phrase "quasi-omnidirectional antenna assembly", as used herein, may include an antenna assembly capable of at least receiving signals over at least a quasi-omnidirectional coverage pattern. Receiving signals over a quasi-omnidirectional coverage pattern may include simultaneously receiving signals in all directions of a given set of directions, e.g., to cover a substantially continuous predefined coverage area, such that in any certain direction within the set of directions the signals are received at a gain that is within a predefined margin, e.g., a margin of $10 \log_{10}(m)$, where m denotes a number of elements in a phased array, from a maximal gain provided by the antenna assembly, when directed to receive and/or transmit in the certain direction. In some demonstrative embodiments, the quasi-omnidirectional antenna assembly may include, or perform the functionality of, at least one quasi-omnidirectional receive antenna or antenna element (RA) capable of receiving signals over the quasi-omnidirectional coverage pattern; and one or more transmit antenna sectors (TS) covering one or more respective sectors of the quasi-omnidirectional coverage pattern. It will be appreciated that the phrase "quasi-omnidirectional antenna assembly", as used herein, may also include any suitable omnidirectional or multidirectional antenna assembly.

Reference is now made to FIG. 1, which schematically illustrates a block diagram of a system 100 in accordance with some demonstrative embodiments.

As shown in FIG. 1, in some demonstrative embodiments, system 100 may include a wireless communication network including one or more wireless communication devices, e.g., wireless communication devices 102 and/or 130, capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 130 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, wireless communication devices 102 and/or 130 may include wireless communication units 104 and/or 132, respectively, to perform wireless communication with wireless communication devices 102 and/or 130, respectively, and/or with one or more other wireless communication devices, e.g., as described below. Wireless communication devices 102 and/or 130 may also include, for example, one or more of a processor 114, an input unit 106, an output unit 108, a memory unit 110, and a storage unit 112. Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and/or 132 include, for example, one or more wireless transmitters, receivers and/or transceivers able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

At least one of wireless communication unit 104 and 132 may include, or may be associated with, a plurality of antenna assemblies. In one embodiment, only one of wireless communication unit 104 and 132 may include a plurality of antenna assemblies, while another one of wireless communication units 104 and 132 may include a plurality of antenna assemblies. In another embodiment, each of wireless communication units 104 and 132 may include a plurality of antenna assemblies. In one example, wireless communication unit 104 may include, or may be associated with, a first number of antenna assemblies, e.g., two antenna assemblies 116 and 120; and/or wireless communication unit 132 may include, or may be associated with, a second number of antenna assemblies, e.g., three antenna assemblies 134, 136 and 138.

In some demonstrative embodiments, antenna assemblies 116 and 120 may have two respective, different, coverage areas. For example, antenna assemblies 116 and 120 may be positioned on first and second, e.g., opposite, sides of device 102. Antenna assemblies 134, 136 and 138 may have three respective, different, coverage areas. For example, antenna assemblies 134, 136 and 138 may be positioned on three, different, sides of device 130.

In some demonstrative embodiments, antenna assemblies 116, 120, 134, 136 and/or 138 may include quasi-omnidirectional antenna assemblies. For example, each antenna assembly of assemblies 116, 120, 134, 136 and/or 138 may include, or perform the functionality of, at least one quasi-omnidirectional receive antenna (RA) 126, e.g., such that RA 126 may receive signals over a corresponding quasi-omnidirectional coverage pattern; and one or more transmit antenna sectors (TS) 124 covering one or more respective sectors of the coverage area of the quasi-omnidirectional coverage pattern. In one example, one or more antenna assemblies of antenna assemblies 116, 120, 134, 136 and/or 138 may include, or may be implemented as part of, a suitable phased array antenna. In some embodiments, RA 126 and TS 124 of an antenna assembly may be implemented by separate antenna elements of the antenna assembly. In other embodiments, RA 126 and TS 124 of the antenna assembly may be implemented by a common antenna element, e.g., a suitable receive/transmit element of the antenna assembly.

In some demonstrative embodiments, wireless communication units 104 and 132 may implement a "training" session (or "beamforming training"), e.g., as part of establishing a first connection and/or association between devices 102 and 130, to enable wireless communication unit 104 to select an antenna assembly ("receive antenna assembly"), e.g., of antenna assemblies 116 and 120, to be used for receiving transmissions from wireless communication unit 132 and/or an antenna assembly ("transmit antenna assembly"), e.g., of antenna assemblies 116 and 120, to be used for transmitting transmissions to wireless communication unit 132; and/or to enable wireless communication unit 132 to select a receive antenna assembly, e.g., of antenna assemblies 134, 136 and 138, to be used for receiving transmissions from wireless communication unit 104 and/or a transmit antenna assembly, e.g., of antenna assemblies 134, 136 and 138, to be used for transmitting transmissions to wireless communication unit 104, e.g., as described in detail below.

In some demonstrative embodiments, a first wireless communication unit ("the initiator") of wireless communication units 104 and 132, e.g., wireless communication unit 104, may transmit a plurality of first training transmissions, e.g., in the form of training packets, via one or more antenna assemblies of the initiator, for example, while a second wireless communication unit ("the responder") of wireless communication units 104 and 132, e.g., wireless communication unit 132, may operate one or more antenna assemblies of the responder, e.g., in an omnidirectional receive mode, to receive the first training transmissions; the responder may transmit a plurality of second training transmissions, e.g., in the form of training packets, via one or more of the plurality of antenna assemblies of the responder, while the initiator may operate the plurality of antenna assemblies of the initiator to receive the second transmissions; and the initiator and/or responder may select the receive and/or transmit antenna assemblies based on the first and/or second training transmissions, e.g., as described in detail below.

In some demonstrative embodiments, wireless communication unit 104 may transmit a suitable training packet, e.g., including any suitable predefined training sequence, via each TS 124 of each of antenna assemblies 116 and 120. The transmission of the training sequence may include, for example, a training sequence suitable for reception at a Signal-to-Noise-Ratio (SNR), which is at least k decibel (dB) lower than a minimum SNR to be used for data transmission after the beamforming training is completed, e.g., wherein $k=10 \log_{10}(m)$, and m is the maximum number of antenna elements per assembly. For example, wireless communication unit 104 may perform a sequence of sector scans (SS) including a first SS of antenna assembly 116 followed by a SS of antenna assembly 120. The SS of an antenna assembly may include any suitable algorithm and/or method of sequentially transmitting a training packet via each of the one or more transmit sectors 124 of the antenna assembly. For example, the SS of an antenna assembly including NS transmit sectors 124 may include sequentially transmitting NS training packets via the NS transmit sectors 124, respectively.

In some demonstrative embodiments, wireless communication unit 104 may perform the SS sequence, e.g., for a number of times equal to or greater than a number of the antenna assemblies of device 130. In one example, wireless communication unit 104 may perform the SS sequence for three times, for example, if wireless communication unit 104 is provided with information indicating that device 130 includes three antenna assemblies, e.g., as described below. In another example, wireless communication unit 104 may repeatedly perform the SS sequence, e.g., during a plurality of constant scan intervals, for example, if wireless communication unit 104 is not provided with information indicating the number of antenna assemblies implemented by device 130, e.g., as described below.

In some demonstrative embodiments, wireless communication unit 104 may include, in each training packet transmitted via a TS 124 of an antenna assembly of antenna assemblies 116 and 120, an identification of the antenna assembly and the TS 124. For example, antenna assembly 116 may be assigned a first identification value, e.g., zero; antenna assembly 120 may be assigned a second identification value, e.g., one; and each of TS 124 may be assigned with a different identification value, e.g., between one and the number of TS 124.

In some demonstrative embodiments, wireless communication unit 104 may include in each training packet a value indicating a remaining number of training packets to be transmitted successive to the training packet.

In some demonstrative embodiments, wireless communication unit 132 may receive at least some of the first training packets. Wireless communication unit 132 may select, e.g., based on the received first training packets, the responder receive antenna assembly, e.g., of antenna assemblies 134, 136 and 138, to be used for receiving transmissions from wireless communication unit 104. For example, wireless communication unit 132 may select from antenna assemblies 134, 136 and 138 the antenna assembly providing the best reception of the first training packets, e.g., the antenna assembly providing the best Signal-to-Noise-Ratio (SNR), and/or based on any other suitable criteria and/or parameter.

In some demonstrative embodiments, wireless communication unit 132 may transmit a suitable training packet, e.g., including any suitable predefined training sequence, via each TS 124 of each of one or more of antenna assemblies 134, 136 and 138. For example, wireless communication unit 132 may perform a sequence of SS including one or more of a SS of antenna assembly 134, a SS of antenna assembly 136, and a SS of antenna assembly 138.

In some demonstrative embodiments, the SS sequence may include a SS of each of antenna assemblies 134, 136 and 138. For example, wireless communication unit 132 may perform a sequence of SS including a first SS of antenna assembly 134, followed by a second SS of antenna assembly 136, and a third SS of antenna assembly 138. In other embodiments, the SS sequence may include a SS of less than all of antenna assemblies 134, 136 and 138, for example, a SS of only one of antenna assemblies 134, 136 and 138, e.g., as described below. In one example, the SS sequence may include a SS of the selected responder receive antenna assembly, for example, if antenna reciprocity is assumed, e.g., as described below.

In some demonstrative embodiments, wireless communication unit 132 may perform the SS sequence, e.g., for a number of times equal to a number of the antenna assemblies of device 102. For example, wireless communication unit 132 may perform the SS sequence for two times, to be received by the two antenna assemblies 116 and 120, respectively. In other demonstrative embodiments, wireless communication unit 132 may perform the SS sequence for a number of times lesser than the number of the antenna assemblies of device 102. For example, wireless communication unit 132 may perform a single SS sequence, e.g., as described below.

In some demonstrative embodiments, wireless communication unit 132 may include in each training packet transmitted via a TS 124 of an antenna assembly an identification of the antenna assembly and the TS 124.

In some demonstrative embodiments, wireless communication unit 132 may identify, e.g., based on the received first training packets, an antenna assembly of antenna assemblies 116 and 120 ("the identified initiator transmit antenna assembly"), and/or one or more TS 124 of the identified antenna assembly ("the identified initiator TS") providing the best reception of the first training packets at device 130.

In some demonstrative embodiments, wireless communication unit 132 may also include in each of the second training packets a feedback indication of the identified initiator transmit antenna assembly and/or the identified initiator TS of device 102.

In some demonstrative embodiments, wireless communication unit 104 may receive at least some of the second training packets.

In some demonstrative embodiments, wireless communication unit 104 may select, e.g., based on the received second training packets, the initiator transmit antenna assembly, e.g., of antenna assemblies 116 and 120, to be used for transmitting transmissions to wireless communication unit 132. For example, wireless communication unit 104 may select the initiator transmit antenna assembly to include the identified initiator transmit antenna assembly, as indicated by the second training packets.

In some demonstrative embodiments, wireless communication unit 104 may select, e.g., based on the received second training packets, one or more TS 124 of the initiator transmit antenna assembly to be used for transmitting transmissions to wireless communication unit 132. For example, wireless communication unit 104 may select the one or more TS 124 to include the identified initiator TS, as indicated by the second training packets.

In some demonstrative embodiments, wireless communication unit 104 may select, e.g., based on the received second training packets, the initiator receive antenna assembly, e.g., of antenna assemblies 116 and 120, to be used for receiving transmissions from wireless communication unit 132. For example, wireless communication unit 104 may select from antenna assemblies 116 and 120 the antenna assembly providing the best reception of the second training packets, e.g., the antenna assembly providing the best SNR, and/or based on any other suitable criteria and/or parameter.

In some demonstrative embodiments, wireless communication unit 104 may identify, e.g., based on the received second training packets, an antenna assembly of antenna assemblies 134, 136 and 138 ("the identified responder transmit antenna assembly"), and/or one or more TS 124 of the identified antenna assembly ("the identified responder TS") providing the best reception of the second training packets at device 102.

In some demonstrative embodiments, wireless communication unit 104 may transmit to wireless communication unit 132 a feedback indication of the identified responder transmit antenna assembly and/or the identified responder TS of device 130. For example, wireless communication unit 104 may transmit the feedback to wireless communication unit 132 in the form of, or as part of, any suitable feedback frame; and/or wireless communication unit 132 may acknowledge the receipt of the feedback frame by transmitting a suitable acknowledgement (ACK) frame.

In some demonstrative embodiments, wireless communication unit 132 may select, e.g., based on the feedback from wireless communication unit 104, the responder transmit antenna assembly, e.g., of antenna assemblies 134, 136 and 138, to be used for transmitting transmissions to wireless communication unit 104. For example, wireless communication unit 132 may select the responder transmit antenna assembly to include the identified responder transmit antenna assembly, as indicated by the feedback from wireless communication unit 104. In some demonstrative embodiments, wireless communication unit 132 may select, e.g., based on the feedback from wireless communication unit 104, one or more TS 124 of the responder transmit antenna assembly to be used for transmitting transmissions to wireless communication unit 104. For example, wireless communication unit 132 may select the one or more TS 124 to include the identified responder TS, as indicated by the feedback from wireless communication unit 104.

Figure 2:
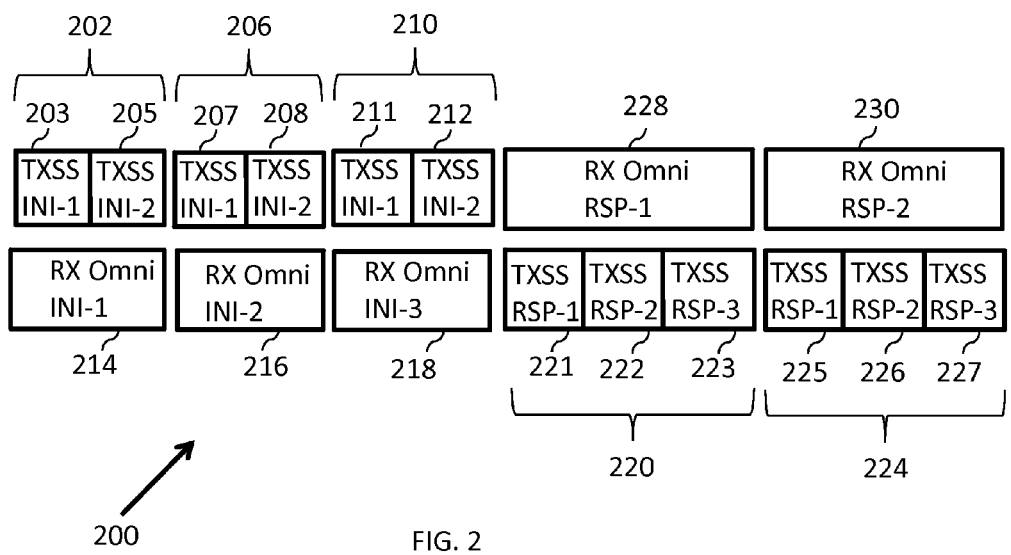
FIG. 2 is a schematic illustration of a training session, in accordance with one demonstrative embodiment.

Reference is made to FIG. 2, which schematically illustrates a training session 200 between an initiator and a responder, in accordance with one demonstrative embodiment. In some embodiments, the training session of FIG. 2 may be implemented by any suitable "initiator" and "responder" devices and/or units, e.g., wireless communication units 104 (FIG. 1) and/or 132 (FIG. 1).

According to the embodiments of FIG. 2, the initiator, e.g., device 102 (FIG. 1), may include a first number, denoted $NA_I$, of antenna assemblies, for example, $NA_I=2$ antenna assemblies, e.g., antenna assemblies 116 and 120 (FIG. 1); and the responder, e.g., device 130 (FIG. 1), may include a second number, denoted $NA_R$, of antenna assemblies, for example, $NA_R=3$ antenna assemblies, e.g., antenna assemblies 134, 136 and 138 (FIG. 1). The $NA_I$ antenna assemblies may include a total number, denoted $NA_R$, of transmit sectors; and the $NA_R$ antenna assemblies may include a total number, denoted $NS_R$, of transmit sectors.

According to the embodiments of FIG. 2, the initiator may be provided with configuration information indicating the number of the $NA_R$ antenna assemblies of the responder. The configuration information may be provided to the initiator in any suitable manner, e.g., as part of a configuration and/or via information received from the responder and/or any other device.

In some demonstrative embodiments, the initiator may transmit a first plurality of training transmissions via each of the $NS_I$ transmit sectors, for example, by repeating, for $NA_R$ times, the transmitting of $NS_I$ training packets via the transmit sectors of the $NA_I$ antenna assemblies, thereby allowing the responder to receive, via each of the antenna assemblies of the responder, the training transmissions from all the transmit sectors of the initiator. For example, the responder may sequentially switch between the $NA_R$ antenna assemblies of the responder, e.g., every switching period, which may be equal to the aggregated time packet transmission time of $NS_I$ training packets.

As shown in FIG. 2, the initiator may transmit a first sequence 202 of SS, during a time period 214 in which the responder is to attempt to receive the first sequence via a first antenna assembly, e.g., antenna assembly 134 (FIG. 1), of the responder. The sequence of SS 202 may include performing a first SS 203 via a first antenna assembly, e.g., antenna assembly 116 (FIG. 1), of the initiator followed by a second SS 205 via a second antenna assembly, e.g., antenna assembly 120 (FIG. 1), of the initiator. The initiator may transmit a second sequence 206 of SS, during a time period 216 in which the responder is to attempt to receive the second sequence via a second antenna assembly, e.g., antenna assembly 136 (FIG. 1), of the responder. The sequence of SS 206 may include performing a first SS 207 via a first antenna assembly, e.g., antenna assembly 116 (FIG. 1), of the initiator followed by a second SS 208 via a second antenna assembly, e.g., antenna assembly 120 (FIG. 1), of the initiator. The initiator may transmit a third sequence 210 of SS, during a time period 218 in which the responder is to attempt to receive the third sequence via a third antenna assembly, e.g., antenna assembly 138 (FIG. 1), of the responder. The sequence of SS 210 may include performing a first SS 211 via a first antenna assembly, e.g., antenna assembly 116 (FIG. 1), of the initiator followed by a second SS 212 via a second antenna assembly, e.g., antenna assembly 120 (FIG. 1), of the initiator.

In some demonstrative embodiments, the responder may receive at least some of the first training packets of SS 202, 206 and 210. The responder may select, e.g., based on the received first training packets, the responder receive antenna assembly to be used for receiving transmissions from the initiator, e.g., s described above.

In some demonstrative embodiments, the responder may transmit a second plurality of training transmissions via each of the $NS_R$ transmit sectors, for example, by transmitting $_I$ training packets via each of the $NS_R$ transmit sectors of the $NA_R$ antenna assemblies $NA_I$ times, while the initiator may operate at a receive mode to attempt and receive the second plurality of transmissions, for example, by sequentially switching between the $NA_I$ antenna assemblies of the initiator, e.g., every switching period, which may be equal to the aggregated time packet transmission time of $NS_2$ training packets.

As shown in FIG. 2, the responder may transmit a first sequence 220 of SS, during a time period 228 in which the initiator is to attempt to receive the first sequence via a first antenna assembly, e.g., antenna assembly 116 (FIG. 1), of the initiator. The sequence of SS 220 may include performing a first SS 221 via a first antenna assembly, e.g., antenna assembly 134 (FIG. 1), of the responder followed by a second SS 222 via a second antenna assembly, e.g., antenna assembly 136 (FIG. 1), of the responder, and by a third SS 223 via a third antenna assembly, e.g., antenna assembly 138 (FIG. 1), of the responder. The responder may transmit a second sequence 224 of SS, during a time period 230 in which the initiator is to attempt to receive the second sequence via a second antenna assembly, e.g., antenna assembly 120 (FIG. 1), of the initiator. The sequence of SS 224 may include performing a first SS 225 via a first antenna assembly, e.g., antenna assembly 134 (FIG. 1), of the responder followed by a second SS 226 via a second antenna assembly, e.g., antenna assembly 136 (FIG. 1), of the responder, and by a third SS 227 via a third antenna assembly, e.g., antenna assembly 138 (FIG. 1), of the responder.

Figure 3:
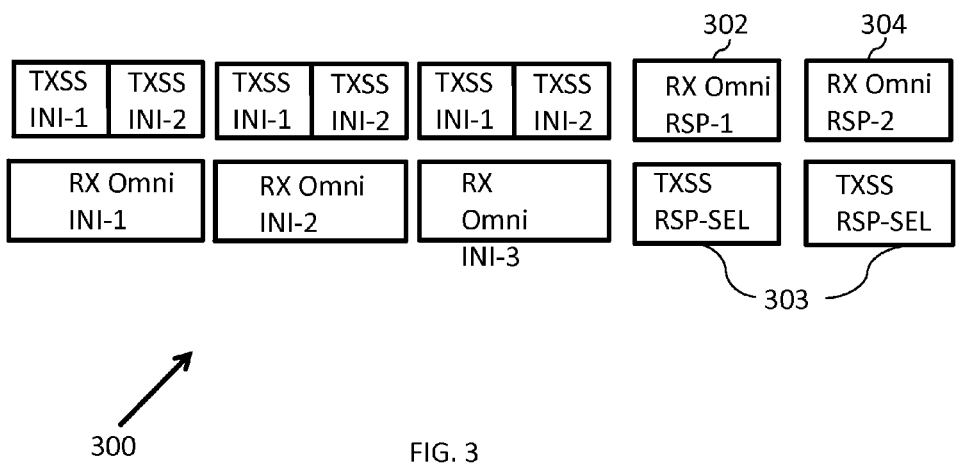
FIG. 3 is a schematic illustration of a training session, in accordance with another demonstrative embodiment.

Reference is made to FIG. 3, which schematically illustrates a training session 300 between an initiator and a responder, in accordance with another demonstrative embodiment. In some embodiments, the training session of FIG. 3 may be implemented by any suitable "initiator" and "responder" devices and/or units, e.g., wireless communication units 104 (FIG. 1) and/or 132 (FIG. 1).

According to the embodiments of FIG. 3, the initiator, e.g., device 102 (FIG. 1), may include $NA_I$ antenna assemblies and the responder, e.g., device 130 (FIG. 1), may include $NA_R$ antenna assemblies, e.g., as described above with reference to FIG. 2.

According to the embodiments of FIG. 3, the initiator may perform $NA_R$ sequences of SS, e.g., as described above with reference to FIG. 2.

According to the embodiments of FIG. 3, antenna reciprocity of the initiator and the responder may be assumed. According to this assumption, the selected responder receive antenna assembly may also be assumed as the selected responder transmit antenna assembly; and the identified initiator transmitter antenna assembly, which is identified by the responder based on the first transmissions, may also be assumed to be the selected initiator receive antenna assembly and the selected initiator receive antenna assembly. Accordingly, the second transmissions from the responder to the initiator may be used for informing the initiator of the selected antenna assemblies. For example, the responder may perform sector scans from only the selected responder receive antenna assembly and/or may transmit the second training packets only to the identified initiator transmit antenna assembly.

As shown in FIG. 3, the responder may transmit a SS of the second training packets from the selected responder transmit antenna assembly, during a time period in which the initiator is attempting to receive the second training packets via the identified initiator transmit antenna assembly. For example, the initiator, which may not have information relating to the identified initiator transmit antenna assembly, may attempt to receive the second training packets via a first antenna assembly, e.g., antenna assembly 116 (FIG. 1), of the initiator during a first time period 302; and the initiator may attempt to receive the second training packets via a second antenna assembly, e.g., antenna assembly 120 (FIG. 1), of the initiator during a second time period 304. The responder may perform a SS to transmit the second training packets 303 via the selected responder receive antenna assembly during the time period 302, e.g., if the identified initiator transmit antenna assembly includes the first antenna assembly, e.g., antenna assembly 116 (FIG. 1), of the initiator; or during the time period 304, e.g., if the identified initiator transmit antenna assembly includes the second antenna assembly, e.g., antenna assembly 120 (FIG. 1), of the initiator. Time periods 302 and/or 304, during which the initiator may attempt to receive the second training packets from the responder, may be shorter, for example, than time periods 228 and/or 230 (FIG. 2), respectively, since, for example, time periods 302 and/or 304 may be required to accommodate the transmission time of a single SS, e.g., in opposed to time periods 228 and/or 230 (FIG. 2), which may be required to accommodate the transmission time of three SS.

Referring back to FIG. 1, in some demonstrative embodiments, wireless communication unit 104 may not have information indicating the number and/or configuration of antenna assemblies implemented by device 130; and/or wireless communication unit 132 may not have information indicating the number and/or configuration of antenna assemblies implemented by device 104. According to these embodiments, wireless communication units 104 and/or 132 may not have information defining a time for simultaneously starting to perform the training session; and/or wireless communication units 104 and/or 132 may not have information the duration of the SS sequences performed by wireless communication units 132 and/or 104, respectively.

Figure 4:
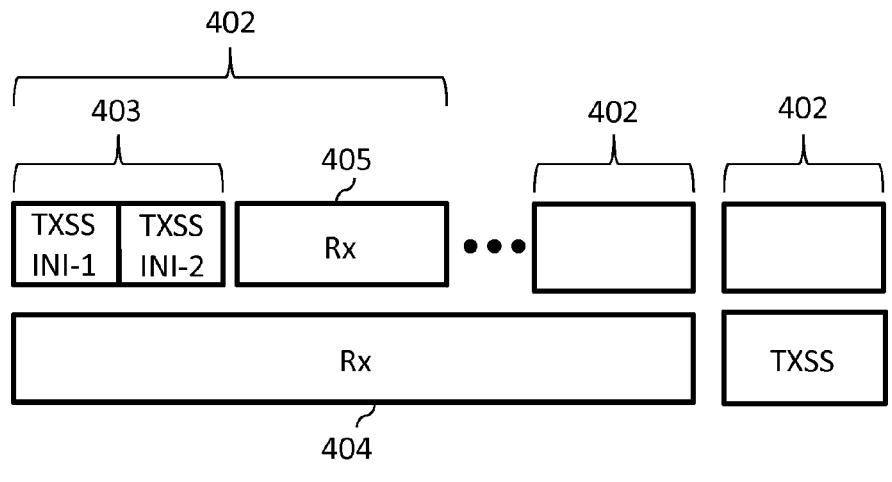
FIG. 4 is a schematic illustration of a training session, in accordance with yet another demonstrative embodiment.

Reference is also made to FIG. 4, which schematically illustrates a training session 400 between an initiator and a responder, in accordance with another demonstrative embodiment. In some embodiments, the training session of FIG. 4 may be implemented by any suitable "initiator" and "responder" devices and/or units, e.g., wireless communication units 104 (FIG. 1) and/or 132 (FIG. 1).

In some demonstrative embodiments, wireless communication unit 104 (FIG. 1) may repeatedly perform the SS sequence 403 of the transmission of the first training packets during a plurality of constant time periods ("scan intervals") 402, which may enable wireless communication unit 132 (FIG. 1) to detect the first training packets via at least one antenna assembly of wireless communication unit 132 (FIG. 1). The scan interval 402 may include a time period which is less than or equal to a maximal scan interval which may be predefined and/or preset at wireless communication units 104 and 132 (FIG. 1).

In some demonstrative embodiments, wireless communication unit 132 (FIG. 1) may switch between antenna assemblies 134, 136 and 138 (FIG. 1), e.g., at a rate of every scan interval 402, to attempt and receive the first training packets from wireless communication unit 104 (FIG. 1).

In some demonstrative embodiments, upon receiving at least one of the first training packets, wireless communication unit 132 may determine a time at which each of scan intervals 402 begins, e.g., based on the received first training packet. Accordingly, wireless communication unit 132 (FIG. 1) may switch between the $NA_R$ antenna assemblies 134, 136 and 138 (FIG. 1) of wireless communication unit 132 (FIG. 1) to receive the SS sequence of the first training packets via the $NA_R$ antenna assemblies, e.g., during a time period 404 including $NR_2$ respective scan intervals 402, e.g., in analogy to the description above with reference to FIG. 2. Wireless communication unit 132 (FIG. 1) may determine the selected responder receive antenna assembly, the identified initiator transmit antenna assembly and/or the identified initiator TS, e.g., based on the received first training packets, as described above.

In some demonstrative embodiments, a time period 405, within each scan interval 402 may be allocated for wireless communication unit 132 (FIG. 1) to perform the sequence of SS for transmitting the second training packets; and for wireless communication unit 104 (FIG. 1) to attempt and receive the second training packets via each of antenna assemblies 116 and 120 (FIG. 1), e.g., as described above with reference to FIG. 2. The duration of time period 405 may be reduced, for example, if antenna reciprocity is assumed, e.g., as described above with reference to FIG. 3. Wireless communication unit 104 (FIG. 1) may inform wireless communication unit 132 (FIG. 1) of the length and/or timing of the scan interval 402, for example, by transmitting an indication of when scan interval 402 begins and/or the length of time interval, e.g., as part of each training packet.

Figure 5:
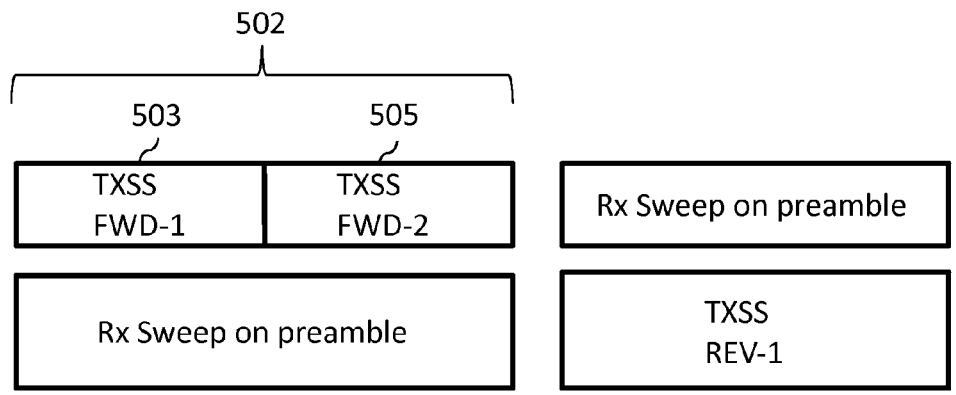
FIG. 5 is a schematic illustration of a training session, in accordance with yet another demonstrative embodiment.

Reference is also made to FIG. 5, which schematically illustrates a training session 500 between an initiator and a responder, in accordance with another demonstrative embodiment. In some embodiments, the training session of FIG. 5 may be implemented by any suitable "initiator" and "responder" devices and/or units, e.g., wireless communication units 104 (FIG. 1) and/or 132 (FIG. 1).

In some demonstrative embodiments, the initiator may perform a single SS sequence 502 to transmit the first training packets via each TS of each of the antenna assemblies of the initiator, e.g., as described above. For example, SS sequence 502 may include performing a first SS 503 via a first antenna assembly, e.g., antenna assembly 116 (FIG. 1), of the initiator followed by a second SS 505 via a second antenna assembly, e.g., antenna assembly 120 (FIG. 1), of the initiator.

In some demonstrative embodiments, each of the first training packets transmitted during SS sequence 502 may include a detection preamble having a duration ("the preamble length"), which is equal to or longer than a time period required for the responder to attempt to detect the first training packets via each antenna assembly of the responder. In one example, it may be assumed that the responder includes less than four antenna assemblies. According to this example, the preamble length may be 8*Td, wherein Td denotes the duration required for receiving/detecting a packet, for example, in order to allow the responder up to a time period of 4*Td to detect the preamble by sweeping through the four antenna assemblies, and to allow the responder up to an additional time period of 4*Td to detect the preamble via each of the four assemblies, in order to determine which of the four assemblies is to be selected for reception. The responder may determine the selected responder receive antenna assembly, the identified initiator transmit antenna assembly and/or the identified initiator TS, e.g., based on the received first training packets, as described above.

In some demonstrative embodiments, assuming antenna reciprocity, the responder may perform a SS 504 for transmitting the second training packets via the selected responder receive antenna assembly, while the initiator may sweep, during a time period 506, through the antenna assemblies of the initiator at a rate of the preamble length, to receive the second training packets.

Figure 6:
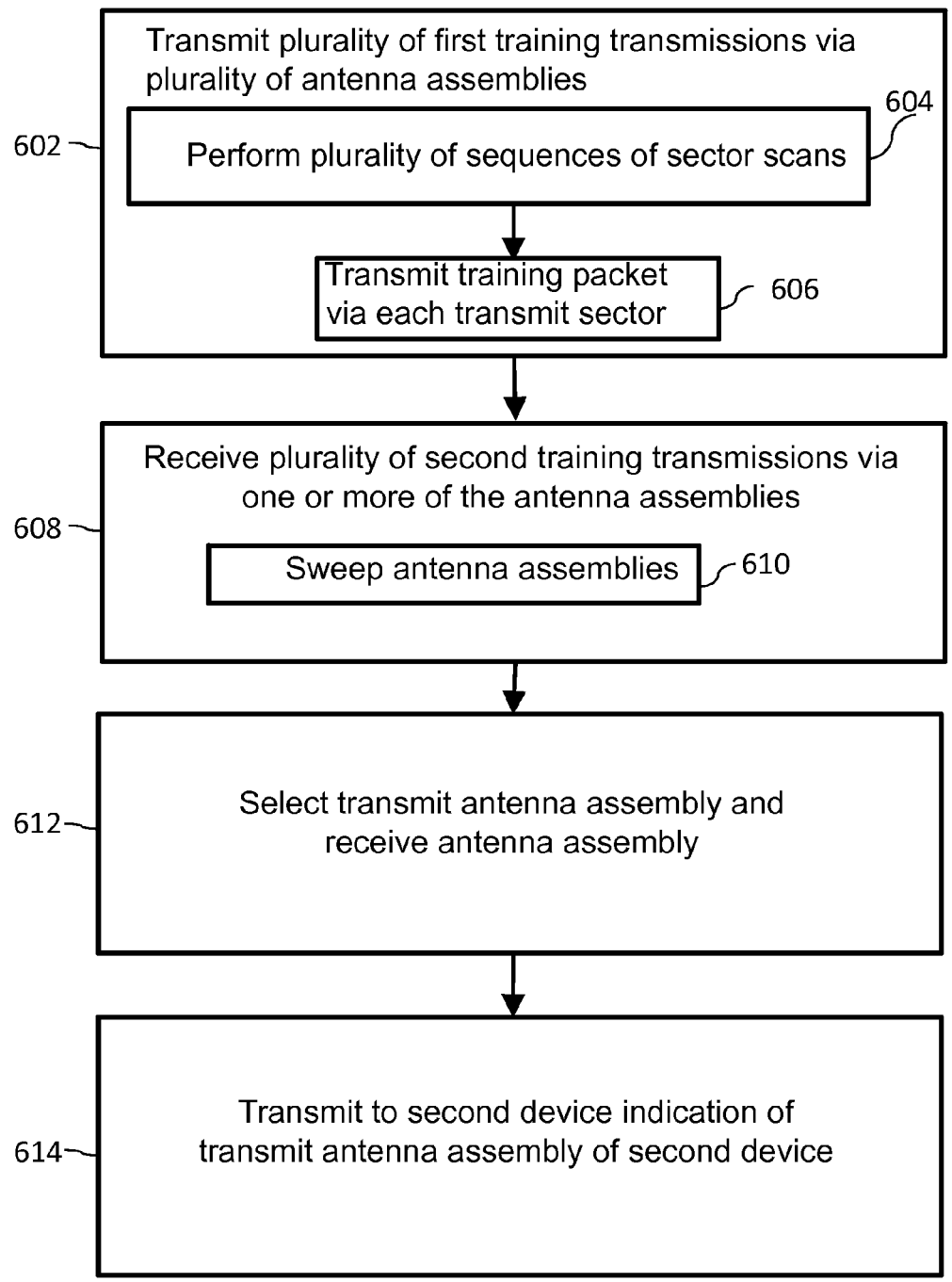
FIG. 6 is a schematic illustration of a method of communicating via multiple antenna assemblies, in accordance with some demonstrative embodiments.

Reference is made to FIG. 6, which schematically illustrates a method of communicating via multiple antenna assemblies, in accordance with some demonstrative embodiments. In some embodiments, one or more of the operations of the method of FIG. 6 may be performed by any suitable wireless communication system e.g., system 100 (FIG. 1); wireless communication device, e.g., devices 102 and/or 130 (FIG. 1); and/or wireless communication unit, e.g., wireless communication units 104 and/or 132 (FIG. 1).

As indicated at block 602, the method may include transmitting, via each quasi-omnidirectional antenna assembly of one or more quasi-omnidirectional antenna assemblies of a first device, a plurality of first transmissions. For example, wireless communication unit 104 (FIG. 1) may transmit a plurality of first transmissions via each of antenna assemblies 116 and 120 (FIG. 1), e.g., as described above.

As indicated at block 604, transmitting the plurality of first transmissions may include performing a plurality of SS sequences, wherein each SS sequence includes performing a plurality of SS of the antenna assemblies, respectively. For example, wireless communication unit 104 (FIG. 1) may perform SS sequences 202, 206 and 210 (FIG. 2), e.g., as described above.

As indicated at block 606, transmitting the plurality of first transmissions may include transmitting a plurality of first training packets via each transmit antenna sector of each quasi-omnidirectional antenna assembly. For example, wireless communication unit 104 may perform SS 202, 206 and 210 (FIG. 2), each including transmitting a training packet via each TS of the corresponding antenna assembly, e.g., as described above.

In some demonstrative embodiments, the plurality of first training packets includes a number of packets equal to a number of a plurality of quasi-omnidirectional antenna assemblies of the second device, for example, if the number of quasi-omnidirectional antenna assemblies of the second device is known at the first device, e.g., as described above with reference to FIGS. 2 and/or 3.

In some demonstrative embodiments, the method may include repeating the transmission of the plurality of first transmissions during a plurality of constant scan intervals, for example, if the number of quasi-omnidirectional antenna assemblies of the second device is not known at the first device, e.g., as described above with reference to FIG. 4.

As indicated at block 608, the method may include receiving, in response to the first transmissions, a plurality of second transmissions from a second device via one or more of the quasi-omnidirectional antenna assemblies. For example, wireless communication unit 104 (FIG. 1) may receive, via antenna assemblies 116 and/or 120 (FIG. 1), a plurality of second training packets transmitted by antenna assemblies 134, 136 and/or 138 (FIG. 1) of device 130 (FIG. 1), e.g., as described above.

As indicated at block 610, receiving the second transmissions may include sweeping between antenna assemblies. For example, wireless communication unit 104 (FIG. 1) may sweep between antenna assemblies 116 and 120 (FIG. 1) during time periods 228 and 230 (FIG. 2), e.g., as described above.

As indicated at block 612, the method may include selecting at the first device, based on the second transmissions, at least one selected transmit antenna assembly for transmitting to the second device and a selected receive antenna assembly for receiving transmissions from the second device. For example, wireless communication unit may determine the selected initiator transmit antenna assembly, the selected initiator TS, and/or the selected initiator receive antenna assembly based on the transmissions received from wireless communication unit 132 (FIG. 1), e.g., as described above.

In some demonstrative embodiments, at least one transmission of the second transmissions may include an indication of an antenna assembly of the antenna assemblies of the first device and an indication of at least one transmit antenna sector of the indicated antenna assembly, and selecting the initiator transmit antenna may include selecting the indicated transmit antenna sector, e.g., as described above.

As indicated at block 614, the method may include transmitting to the second device an indication of at least one antenna assembly and/or TS of the plurality of antenna assemblies of the second device to be used by the second device for transmitting to the first device. For example, wireless communication unit 104 (FIG. 1) may identify antenna assembly and/or a TS 124 (FIG. 1) of device 130 (FIG. 1) based on the second training packets received by wireless communication unit 104 (FIG. 1), and transmit to wireless communication unit 132 (FIG. 1) an indication of the identified antenna assembly and/or TS, e.g., as described above.

Figure 7:
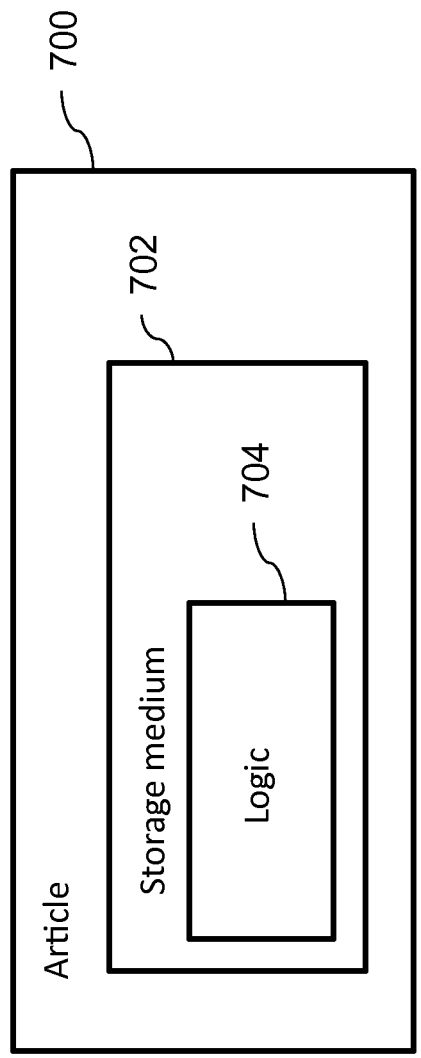
FIG. 7 is a schematic illustration of an article of manufacture, in accordance with some demonstrative embodiments.

Reference is made to FIG. 7, which schematically illustrates an article of manufacture 700, in accordance with some demonstrative embodiments. Article 700 may include a machine-readable storage medium 702 to store logic 704, which may be used, for example, to perform at least part of the functionality of wireless communication unit 104 (FIG. 1), wireless communication device 102 (FIG. 1), wireless communication unit 132 (FIG. 1), wireless communication device 130 (FIG. 1); and/or to perform one or more operations of the method of FIG. 6.

In some demonstrative embodiments, article 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication unit including:
    a receiver to receive one or more initiator training packets from an initiator wireless communication device during a beamforming training session; and
    a transmitter to transmit, in response to said one or more initiator training packets, one or more responder training packets during the beamforming training session, wherein said transmitter is to include in all of said responder training packets a common initiator transmit sector identifier to identify a common transmit sector of said initiator wireless communication device,
    said wireless communication unit is to select, during the beamforming training session, at least one antenna assembly to transmit to and/or receive from said initiator wireless communication device.

2. The wireless communication unit of claim 1, wherein said wireless communication unit is to determine the common initiator transmit sector based on said initiator training packets.

3. A wireless communication unit including:
    a receiver to receive one or more initiator training packets from an initiator wireless communication device during a beamforming training session; and
    a transmitter to transmit, in response to said one or more initiator training packets, one or more responder training packets during the beamforming training session, wherein said transmitter is to include in the one or more responder training packets an initiator antenna assembly identifier to identify an initiator antenna assembly of said initiator wireless communication device,
    said wireless communication unit is to select, during the beamforming training session, at least one antenna assembly to transmit to and/or receive from said initiator wireless communication device.

4. The wireless communication unit of claim 3, said wireless communication unit to select at least one transmit antenna assembly to transmit to said initiator wireless communication device and at least one receive antenna assembly to receive from said initiator wireless communication device.

5. A wireless communication unit including:
    a receiver to receive one or more initiator training packets from an initiator wireless communication device during a beamforming training session, wherein an initiator training packet of said one or more initiator training packets includes an indication of an initiator antenna assembly and an initiator transmit sector of said initiator wireless communication device; and
    a transmitter to transmit, in response to said one or more initiator training packets, one or more responder training packets during the beamforming training session,
    said wireless communication unit is to select, during the beamforming training session, at least one antenna assembly to transmit to and/or receive from said initiator wireless communication device.

6. The wireless communication unit of claim 5, wherein the at least one antenna assembly includes at least one transmit antenna assembly to transmit to said initiator wireless communication device and at least one receive antenna assembly to receive from said initiator wireless communication device.

7. The wireless communication unit of claim 5, wherein said transmitter is to further include, in at least one responder training packet of said one or more responder training packets, —an indication of one or more transmit sectors of at least one transmit antenna assembly of the initiator wireless communication device.

8. A wireless communication unit including:
    a receiver to receive a plurality of initiator training packets from an initiator wireless communication device during a beamforming training session, all of said plurality of initiator training packets including an indication of a common initiator transmit sector of said initiator wireless communication device; and
    a transmitter to transmit, in response to said one or more initiator training packets, one or more responder training packets during the beamforming training session,
    said wireless communication unit is to select, during the beamforming training session, at least one antenna assembly to transmit to and/or receive from said initiator wireless communication device.

9. The wireless communication unit of claim 8, wherein the wireless communication unit is to select at least one transmit antenna assembly to transmit to said initiator wireless communication device, said transmitter to include, in at least one responder training packet of said one or more responder training packets, an indication of the at least one transmit antenna assembly.

10. A wireless communication unit including:
- a receiver to receive a plurality of initiator training packets from an initiator wireless communication device during a beamforming training session, each of the initiator training packets including an indication of a different initiator antenna assembly of said initiator wireless communication device; and
- a transmitter to transmit, in response to said one or more initiator training packets, one or more responder training packets during the beamforming training session,
- said wireless communication unit is to select, during the beamforming training session, at least one antenna assembly to transmit to and/or receive from said initiator wireless communication device.

11. The wireless communication unit of claim 10, wherein the wireless communication unit is to select at least one transmit antenna assembly to transmit to said initiator wireless communication device, the transmitter to include, in at least one responder training packet of said one or more responder training packets, an indication of one or more transmit sectors of the at least one transmit antenna assembly.

12. A wireless communication unit including:
- a receiver to receive one or more initiator training packets from an initiator wireless communication device during a beamforming training session, wherein said wireless communication unit is to sequentially switch a plurality of antenna assemblies to receive said initiator training packets; and
- a transmitter to transmit, in response to said one or more initiator training packets, one or more responder training packets during the beamforming training session,
- said wireless communication unit is to select, during the beamforming training session, at least one antenna assembly to transmit to and/or receive from said initiator wireless communication device.

13. The wireless communication unit of claim 12, wherein said wireless communication unit is to select at least one transmit antenna assembly to transmit to said initiator wireless communication device based on feedback from the initiator wireless communication device.

14. The wireless communication unit of claim 13, wherein said wireless communication unit is to select one or more transmit sectors of the at least one transmit antenna assembly to include one or more transmit sectors indicated by said feedback.

15. The wireless communication unit of claim 12, wherein said wireless communication unit is to select at least one receive antenna assembly to receive from said initiator wireless communication device based on the initiator training packets.

16. A product including a non-transitory storage medium having stored thereon instructions that, when executed by a machine, result in:
- receiving one or more initiator training packets from an initiator wireless communication device during a beamforming training session;
- transmitting, in response to said one or more initiator training packets, one or more responder training packets during the beamforming training session, wherein the instructions result in including in all of said responder training packets a common initiator transmit sector identifier to identify a common transmit sector of said initiator wireless communication device; and
- selecting, during the beamforming training session, at least one antenna assembly to transmit to and/or receive from said initiator wireless communication device.

17. The product of claim 16, wherein the at least one antenna assembly includes at least one transmit antenna assembly to transmit to said initiator wireless communication device and at least one receive antenna assembly to receive from said initiator wireless communication device.

18. A product including a non-transitory storage medium having stored thereon instructions that, when executed by a machine, result in:
- receiving one or more initiator training packets from an initiator wireless communication device during a beamforming training session;
- transmitting, in response to said one or more initiator training packets, one or more responder training packets during the beamforming training session, wherein the instructions result in including in the one or more responder training packets an initiator antenna assembly identifier to identify an initiator antenna assembly of said initiator wireless communication device; and
- selecting, during the beamforming training session, at least one antenna assembly to transmit to and/or receive from said initiator wireless communication device.

19. The product of claim 18, wherein selecting the at least one antenna assembly includes selecting at least one transmit antenna assembly to transmit to said initiator wireless communication device and at least one receive antenna assembly to receive from said initiator wireless communication device.

20. A product including a non-transitory storage medium having stored thereon instructions that, when executed by a machine, result in:
- receiving a plurality of initiator training packets from an initiator wireless communication device during a beamforming training session, all of said plurality of initiator training packets including an indication of a common initiator transmit sector of said initiator wireless communication device;
- transmitting, in response to said one or more initiator training packets, one or more responder training packets during the beamforming training session; and
- selecting, during the beamforming training session, at least one antenna assembly to transmit to and/or receive from said initiator wireless communication device.

21. The product of claim 20, wherein the instructions result in selecting at least one transmit antenna assembly to transmit to said initiator wireless communication device based on feedback from the initiator wireless communication device.

22. A product including a non-transitory storage medium having stored thereon instructions that, when executed by a machine, result in:
- receiving one or more initiator training packets from an initiator wireless communication device during a beamforming training session, wherein said instructions result in sequentially switching a plurality of antenna assemblies to receive said initiator training packets;
- transmitting, in response to said one or more initiator training packets, one or more responder training packets during the beamforming training session; and
- selecting, during the beamforming training session, at least one antenna assembly to transmit to and/or receive from said initiator wireless communication device.

23. The product of claim 22, wherein the instructions result in selecting at least one receive antenna assembly to receive from said initiator wireless communication device based on the initiator training packets.

24. The product of claim 22, wherein the instructions result in including, in at least one responder training packet of said one or more responder training packets, an indication of one or more transmit sectors of at least one transmit antenna assembly of the initiator wireless communication device.

25. A system comprising:
a responder wireless communication device including:
   a processor;
   a storage;
   an input unit;
   an output unit;
   one or more antenna assemblies; and
   a wireless communication unit to receive one or more initiator training packets from an initiator wireless communication device during a beamforming training session, wherein an initiator training packet of said one or more initiator training packets includes an indication of an initiator antenna assembly and an initiator transmit sector of said initiator wireless communication device, the wireless communication unit to transmit, in response to said one or more initiator training packets, one or more responder training packets during the beamforming training session, and to select, during the beamforming training session, at least one antenna assembly to transmit to and/or receive from said initiator wireless communication device.

26. The system of claim 25, wherein said wireless communication unit is to select at least one transmit antenna assembly to transmit to said initiator wireless communication device and at least one receive antenna assembly to receive from said initiator wireless communication device.

27. The system of claim 26, wherein the wireless communication unit is to select the at least one transmit antenna assembly based on feedback from the initiator wireless communication device.

28. The system of claim 26, wherein the wireless communication unit is to select said at least one receive antenna assembly based on the initiator training packets.

29. A method comprising:
receiving one or more initiator training packets from an initiator wireless communication device during a beamforming training session, wherein an initiator training packet of said one or more initiator training packets includes an indication of an initiator antenna assembly and an initiator transmit sector of said initiator wireless communication device;
transmitting, in response to said one or more initiator training packets, one or more responder training packets during the beamforming training session; and
selecting, during the beamforming training session, at least one antenna assembly to transmit to and/or receive from said initiator wireless communication device.

30. The method of claim 29 comprising including, in at least one responder training packet of said one or more responder training packets, an indication of one or more transmit sectors of at least one transmit antenna assembly of the initiator wireless communication device.

* * * * *

UNITED STATES PATENT AND TRADEMARK OFFICE
CERTIFICATE OF CORRECTION

PATENT NO. : 8,897,712 B2  
APPLICATION NO. : 14/027216  
DATED : November 25, 2014  
INVENTOR(S) : Menashe Sofer et al.

It is certified that error appears in the above-identified patent and that said Letters Patent is hereby corrected as shown below:

In the Claims

In column 16, line 44, in claim 7, delete "—an" and insert -- an --, therefor.

Signed and Sealed this
Thirty-first Day of March, 2015

Michelle K. Lee
*Director of the United States Patent and Trademark Office*